US006429870B1

United States Patent
Chen et al.

(10) Patent No.: US 6,429,870 B1
(45) Date of Patent: Aug. 6, 2002

(54) DATA REDUCTION AND REPRESENTATION METHOD FOR GRAPHIC ARTICULATION PARAMETERS (GAPS)

(75) Inventors: Homer H. Chen, Thousand Oaks, CA (US); Hai Tao, Champaign, IL (US)

(73) Assignee: Conexant Systems, Inc., Newport Beach, CA (US)

(*) Notice: Subject to any disclaimer, the term of this patent is extended or adjusted under 35 U.S.C. 154(b) by 0 days.

(21) Appl. No.: 09/638,995

(22) Filed: Aug. 14, 2000

Related U.S. Application Data

(63) Continuation of application No. 09/127,466, filed on Jul. 31, 1998, now Pat. No. 6,130,679, which is a continuation-in-part of application No. 08/799,818, filed on Feb. 13, 1997, now Pat. No. 5,818,463.

(51) Int. Cl.[7] .................................. G06T 15/00
(52) U.S. Cl. .......................................... 345/473
(58) Field of Search ............................ 345/473, 474, 345/475, 440, 418, 419, 422

(56) References Cited

U.S. PATENT DOCUMENTS 5,818,463 A * 10/1998 Tao et al. ................... 345/473
6,130,679 A * 10/2000 Chen et al. ................. 345/473

OTHER PUBLICATIONS

Oka et al., "Real-Time Manipulation of Texture-Mapped Surfaces", Jul. 1987, ACM Computer Graphics, pp. 181–188.*

* cited by examiner

Primary Examiner—Phu K. Nguyen
(74) Attorney, Agent, or Firm—Sonnenschein Nath & Rosenthal

(57) ABSTRACT

A data reduction and representation method reduces the number of graphic articulation parameters (GAPs) that must be stored or transmitted to animate an object. A number of GAPs are identified that can be interpolated from other GAPs. A directed graph is created which depicts the identities of the "derived" GAPs, the "defining" GAPs from which derived GAPs can be interpolated, and the relationship between them. The GAPs reside at nodes on the graph which are interconnected with directed links that indicate the "parent" to "child" relationships, with each link representing an interpolation function which defines how the derived GAPs are interpolated from the defining GAPs. The graph and interpolation functions are conveyed to a decoder. Frames containing defining GAPs are then sent to the decoder, which performs the interpolations as directed by the graph and using the interpolation functions to reconstruct the derived GAPs.

13 Claims, 4 Drawing Sheets

DATA REDUCTION AND REPRESENTATION METHOD FOR GRAPHIC ARTICULATION PARAMETERS (GAPS)

RELATED APPLICATION

This application is a continuation of application Ser. No. 09/127,466 filed Jul. 31, 1998, entitled 'DATA REDUCTION AND REPRESENTATION METHOD FOR GRAPHIC ARTICULATION PARAMETERS (GAPS)' and assigned to Conexant System, Inc. now U.S. Pat. No. 6,130,679. Further application Ser. No. 09/127,466 is a continuation-in-part of application Ser. No. 08/799,818, filed Feb. 13, 1997 entitled 'DATA COMPRESSION FOR ANIMATED THREE DIMENSIONAL OBJECTS' and assigned to Rockwell Science Center, Inc. now U.S. Pat. No. 5,818,463.

BACKGROUND OF THE INVENTION

1. Field of the Invention

This invention relates to the field of parameters for describing object animation, particularly to methods of reducing the number of graphic articulation parameters (GAPs) that must be conveyed to render an object.

2. Description of the Related Art

The existing and developing Motion Picture Expert Group (MPEG) standards provide techniques for coding digital video signals over band limited channels. Included within the MPEG standards are parameter definitions which are to be used to describe the animation of 3-D objects, i.e., the movement of selected points of an image of a 3-D object from one video frame to the next. For example, graphic articulation parameters (GAPs) known as "body animation parameters" (BAPs) have been defined for describing the animation of the human body, and a set of "facial animation parameters" (FAPs) have been developed for describing the movements of a human face.

The MPEG-4 standard under development will include the capability to generate and transmit synthetic "talking head" video for use in multimedia communication systems, and will use the FAP set to convey facial animation information. The FAP set enables model-based coding of natural or synthetic talking head sequences and allows intelligible reproduction of facial expressions, emotions and speech pronunciations at the receiver. Currently, the FAP set contains 68 parameters that define the shape deformation or movements of a face. For example, the parameter open_jaw defines the displacement of the jaw in the vertical direction while the parameter head_yaw specifies the rotational yaw angle of the head from the top of the spine. All the FAPs are defined with respect to a neutral face and expressed in a local coordinate system fixed on the face.

The digitizing of video information typically produces very large amounts of data, which requires vast amounts of storage capacity if the data is to be stored, on a hard drive, CD-ROM, or DVD disc, for example. Similarly, transmitting the video data over a distance via some type of communications link requires a considerable amount of bandwidth. For example, the 68 parameters of the FAP set are defined as having 10 bits each. State-of-the-art modems provide 56 kbits/sec downstream capability from a central location to a home. Since the 68 FAPs represented by 10 bits at a 30 Hz video rate required only 20.4 kbits/sec, it is possible to transmit them uncoded and thus preserve their visual quality. However, this approach does not contemplate nor will it support the simultaneous transmission of multiple talking heads as part of a single video signal as may occur in a virtual meeting, for example, or the transmission of the FAPs as part of larger synthetic objects, for example, full-body animation.

To conserve storage space and to permit the use of currently available communications links, methods of reducing the amount of data required to animate an object are needed.

SUMMARY OF THE INVENTION

A data reduction and representation method as presented which reduces the number of parameters that must be stored or transmitted to animate an object, and provides a representation scheme which enables the animated object to be reconstructed from the reduced number of conveyed parameters.

An interpolation process is used to identify a number of parameters that can be derived from other parameters. A data structure, preferably a directed graph, is then created which depicts the identities of the "derived" parameters, the "defining" parameters from which derived parameters can be interpolated, and the relationship between them. The parameters reside at nodes on the graph which are interconnected with directed links that indicate the "parent" to "child" relationship of a defining parameter, to a derived parameter. Each directed link represents one or more interpolation functions, each of which defines how a derived parameter is to be interpolated from its respective defining parameters.

An extended rational polynomial is preferably used to specify the interpolation functions defined for respective derived parameters. For an interpolation to be carried out, the polynomial must be supplied a set of values (e.g., number of terms, coefficients, exponent values); supplying such a set of values to the polynomial enables a derived parameter to be interpolated from its defining parameters. Sets of values are determined for each of the derived parameters when creating the directed graph, and are stored or transmitted along with the graph. The graph and the sets of values are retrieved from storage or received over a communications link to set up a decoder. Frames containing defining parameters are then sent to the decoder, which performs the interpolations as directed by the graph and using the interpolation functions (by supplying the sets of values to the polynomial) to reconstruct the unstored or untransmitted parameters.

The data reduction and representation method described herein can be utilized for a number of purposes. As noted above, interpolating some parameters from other parameters reduces the amount of data that must be stored or transmitted. Interpolation also enables the creation of views of an object when information on such a view is not available. For example, a decoder could interpolate the left side of a face based on FAPs describing the animation of its right side. The method also permits a hierarchical relationship to be defined between "high level" parameters like the "expression" and "viseme" FAPs, and the lower level FAPs which can be interpolated from them. Many applications would benefit from the method's data reduction capabilities, such as interactive 3-D games, computer kiosks and talking agents.

Further features and advantages of the invention will be apparent to those skilled in the art from the following detailed description, taken together with the accompanying drawings.

BRIEF DESCRIPTION OF THE DRAWINGS

FIG. 5 depicts a directed graph per the present invention.

DETAILED DESCRIPTION OF THE INVENTION

There are two basic approaches to the communication of graphic animation data. The "pixel-based" approach renders the objects and transmits the resulting images as arrays of pixels, whereas the "model-based" approach transmits GAPs and renders the objects at the receiver. The latter approach is preferred because it demands much less bandwidth and allows video editing and manipulation at the bit stream level. The model-based approach divides the task into geometric and articulation modeling. With respect to the animation of the face, for example, geometric modeling defines the polygonal mesh of the face and associated skin texture from which visually realistic facial images from different view angles are synthesized, while articulation modeling deals with the deformation of static geometric models to generate various dynamic effects for intelligible reproduction of facial expressions. Articulation parameters, which have to be constantly updated to drive a face model, play a key role in model-based talking head systems. The method described herein reduces the number of articulation parameters that must be received to update an object.

A set of articulation parameters designed to describe the animation of an object typically identifies its member parameters with respective indices. For example, there are 68 FAPs that have been defined in conjunction with the MPEG-4 standard, which are identified as FAP #1 to FAP #68 (see "Information Technology—Coding of Audio-Visual Objects: Visual; ISO/IEC 14496-2 (ISO/IEC JTC1/SC29/WG11 N2202) (March, 1998), pp. 275–279 for FAP names, descriptions and indices). Two of the 68 FAPs, "viseme" and "expression" are "high-level" parameters; the other 66 FAPs are low-level parameters which describe the movement of facial features such as the jaw, lips, eyes, mouth, nose, cheek, ears, etc. The viseme (visual phoneme) and expression parameters describe facial movements at an abstract level, an each is a compound parameter consisting of multiple sub-FAPs, each of which has its own index (specifically, indices 69–75).

Figure 1:
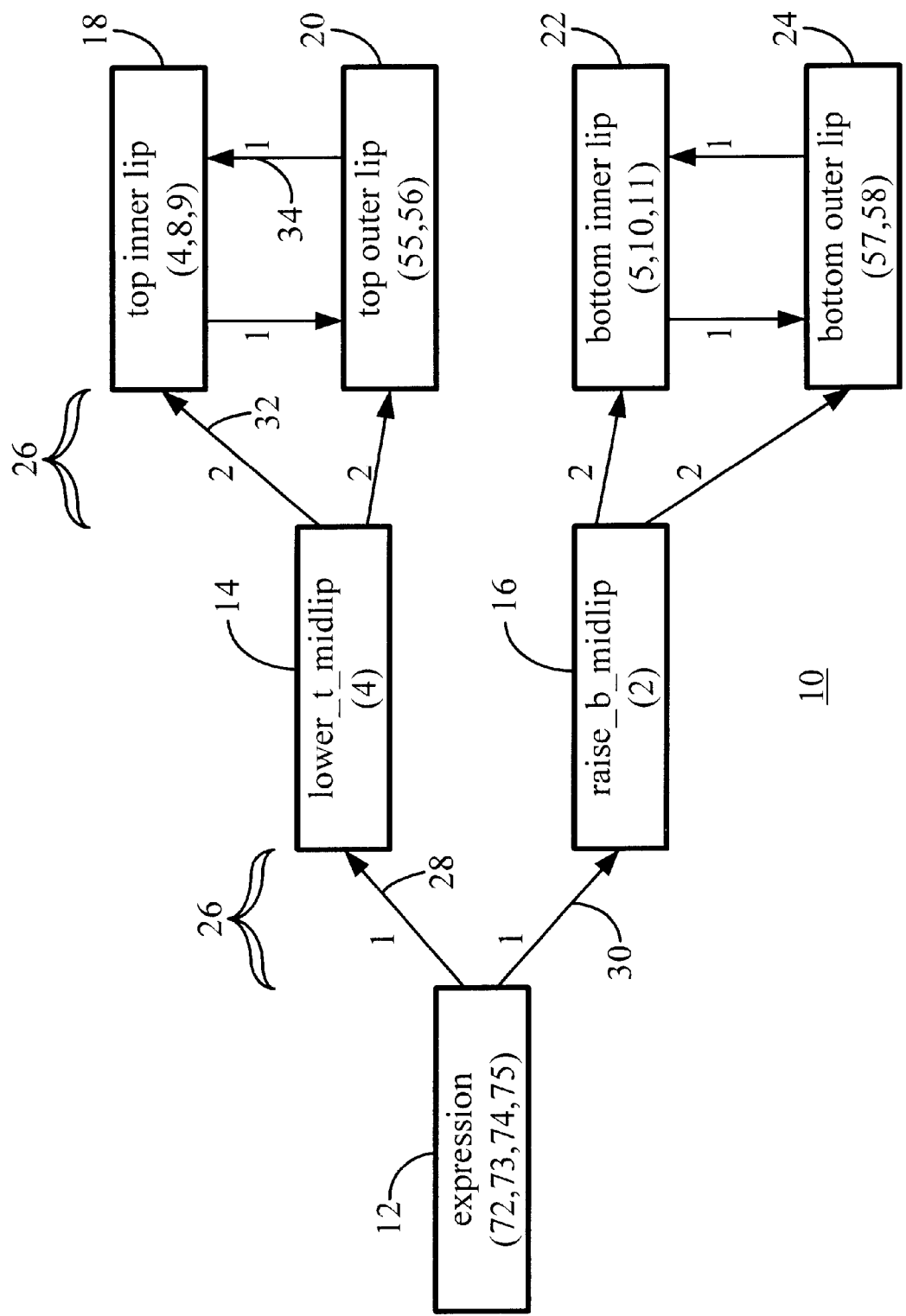
FIG. 1 depicts a directed graph per the present invention.

Per the present method, these indices are used in a data structure to identify one or more FAPs which can be interpolated from one or more other FAPs. An example of such a data structure is shown in FIG. 1, which depicts a directed graph 10. The graph comprises a number of nodes 12, 14, 16, 18, 20, 22 and 24, each of which contains the identifying index of at least one FAP. For example, node 12 contains the "expression" FAP, comprised of four sub-FAPs assigned indices 72, 73, 74 and 75. Nodes 14 and 16 identify the "lower_t_midlip" and "raise_b_midlip" FAPs, which have indices of 4 and 2, respectively. Node 18 contains FAPs 4, 8 and 9, each of which describes the animation of a portion of the top inner lip; node 20 contains FAPs 55 and 56 which describe the top outer lip. Node 22 contains FAPs 5, 10 and 11, each of which describes the animation of a portion of the bottom inner lip; node 24 contains FAPs 57 and 58 which describe the bottom outer lip.

Nodes 12, 14, 16, 18, 20, 22 and 24 are interconnected with "directed links" 26, i.e., arrows that point from one node to another. The node from which a link originates is referred to as a "parent" node, and the node to which the link points is a "child" node. Each link from a parent node to a child node indicates that the FAP (or FAPs) in the child node can be interpolated from the FAB(s) in the parent node. For example, a directed link 28 between node 12 and node 14 indicates that FAP #4 in node 14 can be interpolated from the FAPs 72–75 that make up node 12; similarly, a directed link 30 between node 12 and node 16 indicates that FAP #2 can also be interpolated from node 12.

Nodes 18, 20, 22 and 24 each have "multiple" parents; i.e., the FABs in each of these nodes can be interpolated from more than one other node. For example, one link 32 points to node 18 from node 14, and a second link 34 points to node 18 from node 20. This indicates that FAPs 4, 8 and 9 of node 18 can be interpolated either from FAPs 55–56 of node 20, or from FAP #4 in node 14. As indicated via the directed links on graph 10, node 20 also has multiple parents (nodes 14 and 18), as do nodes 22 (nodes 16 and 24) and nodes 24 (nodes 16 and 22).

When a node has multiple parents, the directed links to it are preferably labeled to indicate their priority during the interpolation process. For the two links pointing to node 18, for example, directed link 34 is labeled "1" and link 32 is labeled "2". These labels indicate that when node 18 is interpolated, node 20 is to be looked to first. If all of the node 20's FAPs are available, node 18 will be interpolated from its 1st parent node 20. If all of nodes 20's FAPs are not available—i.e., if node 20's FAPs also need to be interpolated—the 2nd parent node 14 is to be looked to. 1st and 2nd parent nodes are similarly indicated for nodes 20, 22 and 24. Every directed link is so labeled to indicate the priority of its originating node as a parent.

Each directed link represents a set of interpolation functions—one function for each FAP in a child node—each of which defines how a child node is interpolated from a parent node. An extended rational polynomial (discussed in detail below) is preferably used to specify the interpolation functions. To perform an interpolation, the polynomial must be supplied a set of values (e.g., number of terms, exponent values, coefficients). The sets of values needed to interpolate respective FAPs in a child node are determined when creating the graph. Each directed link is then associated with the respective sets of values—one set for each FAP in the child node to which the link points. A FAP in a child node is interpolated from a parent node by supplying its respective set of values and the FAPs of its parent node to the polynomial and calculating the result.

The polynomial is used in an "encoding" process to create the data structure and to produce the sets of values needed to perform each interpolation. The data structure and the interpolation functions are then conveyed (either by being retrieved from storage or transmitted over a communication link) to "set up" a decoder. Frames containing one or more of the defining FAPs are then sent to the decoder, which interpolates the unsent FAPs using their respective interpolation functions and as directed by the data structure. The respective interpolation functions are preferably conveyed to the decoder by sending only the respective sets of values determined for each child FAP; the decoder is implemented to evaluate the same polynomial used during the encoding process, so that only the sets of values—and not the full expression—need be conveyed.

Thus, a directed graph (or similar data structure) and the set(s) of values associated with each directed link (the "set up" data) need be conveyed only once, at the beginning of a "transmission session", for example, with all FAPs received thereafter processed in accordance with the set-up data. Some overhead is incurred at the beginning of the session to set up the decoder, but significant coding efficiency is realized due to the large numbers of FAPs that are interpolated and thus need not be sent. The length of a "transmission session" can vary from several seconds to several hours, depending on the application; in the context of FAPs, for example, it can mean the animation of a particular face model over a particular period of time.

As a result of the encoding process, it is possible that the same FAP (actually, the same FAP index) will be found in more than one node of the graph. It is also possible that the FAPs of a parent node will themselves need to be interpolated from the FAPs of their own parent node, in which case the interpolation process is performed recursively until all FAPs in the graph can be reconstructed.

In practice, it is critical that the decoder interpolates FAPs the same way the encoder does; otherwise, unpredictable results may be generated. Thus, the same interpolation function should be used for both encoding and decoding.

The method described herein achieves data reduction by enabling a smaller number of FAPs to be conveyed during a transmission session, which are then used to determine the values of other FAPs. Such FAP interpolation exploits the symmetry of the human face or the articulation functions known a priori. For example, the top inner lip FAPs can be sent and then used to determine the top outer lip FAPs, with the inner lip FAPs mapped to the outer lip FAPs by interpolation. These two contours are not identical, but one can be approximately derived from the other while still achieving reasonable visual quality. FAP interpolation is a desirable tool to overcome channel bandwidth limitation. It is also useful for data recovery where a face decoder needs to determine the values of missing FAPs caused by, for example, imperfect face feature extraction at the encoder or packet loss during data transmission.

A process must be provided that defines how the nodes of the graph are to be inspected and the order in which the necessary interpolations will be performed. The chosen process must be known to both encoder and decoder, to insure that the results of the interpolations performed by the decoder are as expected by the encoder. One such process is shown in the flow chart of FIG. 2, which is performed by a decoder upon receipt of set-up data as described above. In the flow chart, the number of nodes in the graph is equal to N, and the number of parent nodes for a given child node is equal to M. The nodes are also individually numbered, starting at zero and increasing by one until each node is numbered. For example, for the graph of FIG. 1, N is seven, M for nodes 14 and 16 is one (parent node 12), and M for each of nodes 18, 20, 22 and 24 is two (parent nodes 14 and 20, 14 and 18, 16 and 24, 16 and 22, respectively). For purposes of the process described in the flow chart, node 12 is identified as node 0, while nodes 14, 16, 18, 20, 22 and 24 are identified as nodes 1, 2, 3, 4, 5 and 6, respectively. If node i is a child node, its parent nodes are identified as node(s) j and (j+1, j+2, etc.).

The process begins by initializing variables "count" and "i" to zero (step 50). In step 52, it is determined whether i is less than N. If not, possibly indicating that all nodes have been inspected and that all possible interpolations have been performed, the flow moves to step 54; if "count" is still equal to zero at step 54, the process ends.

If i<N, node i is inspected to see if it requires interpolation (step 56). If not, i is incremented (step 58) and flow returns to step 52. If so, a variable j is initialized to one (step 60). While j is less than or equal to the number M of parent nodes for node i (step 62), node i's first parent node j (=1=1st parent node) is checked to see if all of its FAPs are available (step 64). If so, node i is interpolated from its first parent node (step 66), "count" is incremented, and j is set equal to M+1 (step 68). If not, j is incremented (step 70), flow returns to step 62, and node i's second parent node (j=2) is checked, and so on until a parent node is found from which node i can be interpolated, or all of node i's parents have been checked. The procedure proceeds in this manner until no more FAPs can be interpolated, and then ends (step 72). Being unable to interpolate any more FAPs can mean that all necessary interpolations have been performed, or that one or more FAPs which require interpolation could not be interpolated—which could indicate a problem with the construction of the graph, or that an insufficient number of FAPs were conveyed to the decoder, for example.

Figure 2:
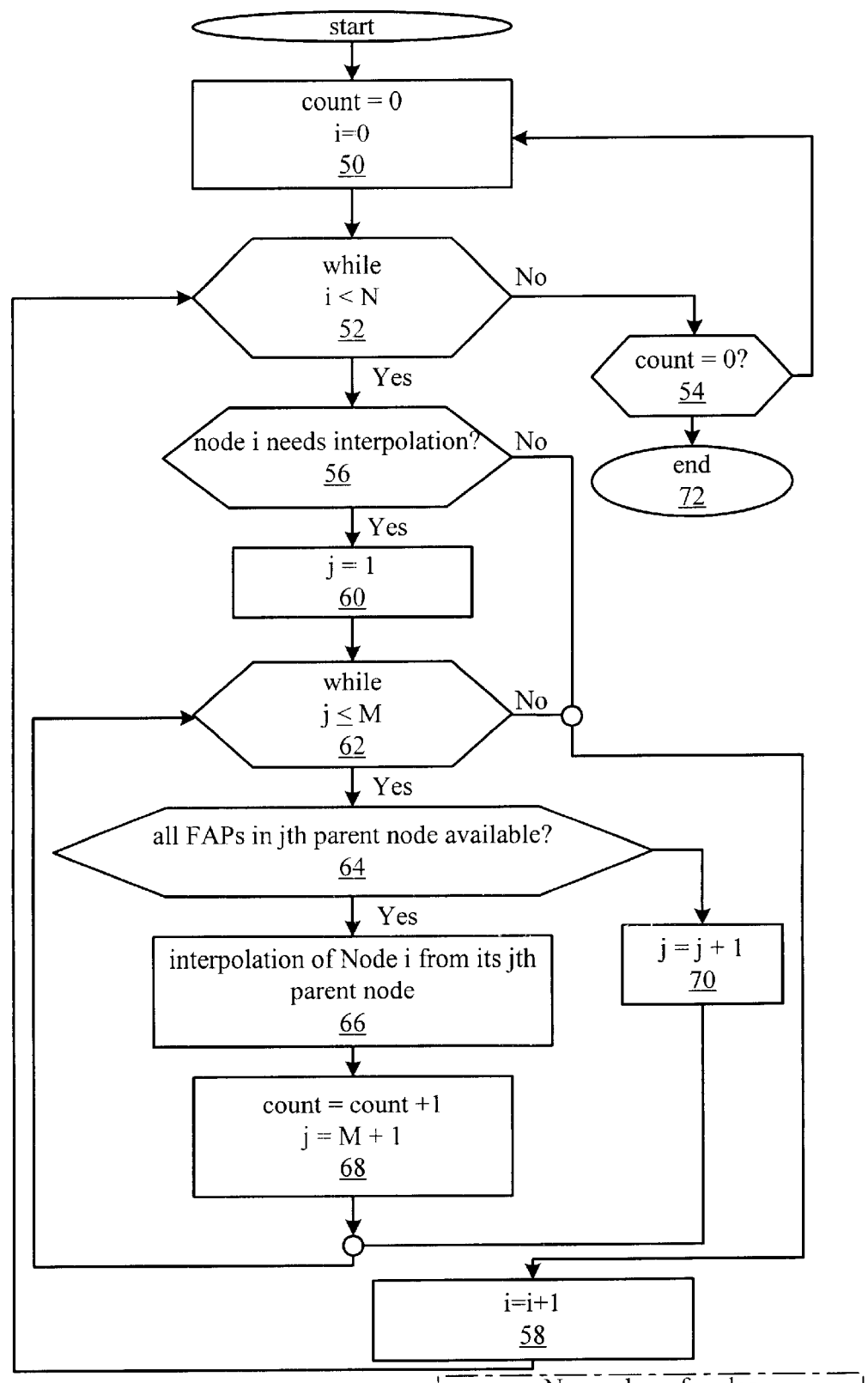
FIG. 2 is a flow chart of an interpolation process as might be used in the present invention.

The process shown in FIG. 2 is merely illustrative—it is only one process sequence among many which could be used to inspect and interpolate a data structure as described herein. Other processes can be successfully employed, as long as the same process is used by both encoder and decoder to insure predictable results.

Though the advantages of the method described herein are best realized when conveying the animation of 3-D objects, the method will also work and provide data reduction for 2-D objects, as long as some of the set of parameters describing the object's animation can be interpolated from others of the set. Because the set of 68 FAPs is well-suited to the use of the described method, it is used herein to explain the method's operation.

As noted above, each directed link in a directed graph per the present invention represents a set of interpolation functions, each of which has an associated set of values needed to interpolate a respective child FAP. Suppose $F_1, F_2, \ldots, F_n$ are the FAPs in a parent node and $f_1, f_2, \ldots, f_m$ are the FAPs in a child node. Then, there are m interpolation functions, defined as follows:

$$f_1 = I_1(F_1, F_2, \ldots, F_3)$$

$$f_2 = I_2(F_1, F_2, \ldots, F_4)$$

$$f_m = I_m(F_1, F_2, \ldots, F_h)$$

Each interpolation function I( ) is preferably in a rational polynomial form as follows:

$$I(F_1, F_2, \ldots, F_n) = \sum_{i=0}^{K-1} \delta(F_{S_i} - a_i)\left(c_i \prod_{j=1}^{n} F_j^{l_{ij}}\right) \bigg/ \sum_{i=0}^{P-1} \left(b_i \prod_{j=1}^{n} F_j^{m_{ij}}\right)$$

where K and P are the numbers of polynomial products in the numerator and denominator, respectively, $a_j$ and $b_i$ are the coefficients of the ith products, and $1_{ij}$ and $m_{ij}$ are the powers of $F_2$ in the ith product. An optional impulse function $\delta(F_{ij}-a_1)$ may be defined for each term in the numerator polynomial. This impulse function equals 1 only when $F_{Si}=a_i$, where $S_i$ ranges from 1 to n and $a_1$ is an integer. Since the polynomials form a complete functional space, any possible finite interpolation function can be represented in this form to any given precision.

A set of values for each of variables K, P, $a_1$, $S_1$, $c_i$, $b_i$, $l_{ij}$, and $m_{ij}$ is determined for each child FAP when the FAPs are encoded. These respective sets of values (one set for each child FAP) are sent to the decoder along with the data structure to enable the child FAPs to be interpolated from the FAPs of their respective parent nodes. The sets of values determined for each child FAP are preferably arranged into a table form, referred to as an interpolation function table.

Figure 3:
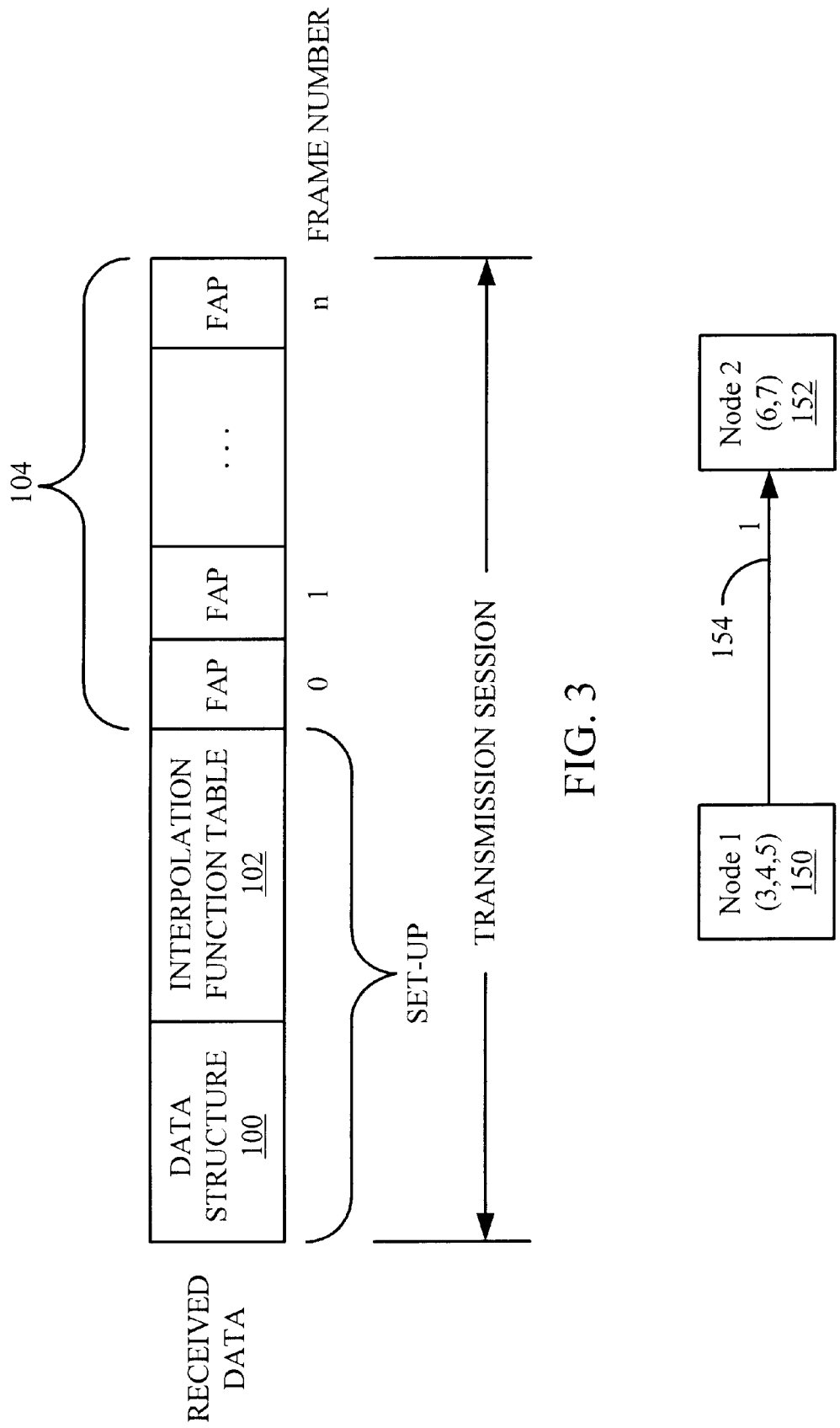
FIG. 3 is a diagram of a data sequence as might be received by a decoder per the present invention.

A diagram depicting one sequence of data as might be received by a decoder is shown in FIG. 3. Data is received by the decoder either directly from an encoder, via a communications link such as a computer network, or by being retrieved from a data storage medium on which the encoded data is stored. The set-up data is received first, which includes the data structure 100 identifying the FAPs making up the parent and child nodes and the relationships between the nodes, and the interpolation functions—preferably in the form of the interpolation function table 102 described above. The set-up data is followed with a sequence of n frames 104, at least some of which contain defining FAPs (not all frames need contain a FAP); these FAPs are received by the decoder which then interpolates the FAPs in the child nodes in accordance with the set-up data. A "transmission session" would begin with the receipt of the set-up data and end with the receipt of the nth frame of FAPs.

Though FIG. 3 depicts the set-up data being received only at the beginning of the transmission session, there is no such limitation in the method. New set-up data can be conveyed to update the decoder at any time in the transmission session, and as often as desired.

Figure 4:
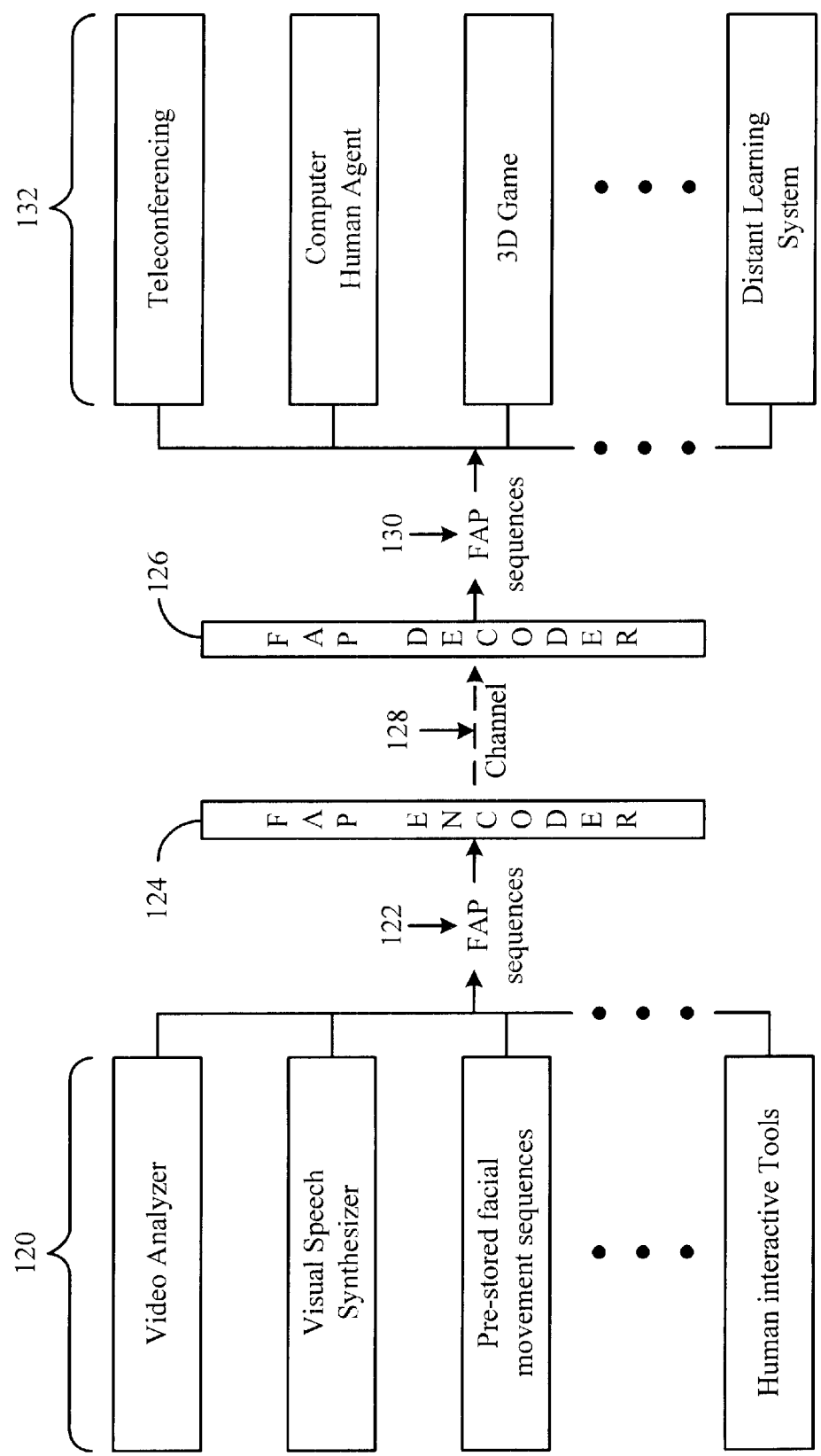
FIG. 4 is a diagram illustrating the flow of graphic articulation data from source to receiver.

The flow of facial animation parameter data from a source to a receiver is shown in FIG. 4. A number of possible origination sources 120, such as a video analyzer or visual speech synthesizer, produce a number of FAPs 122. The FAPs are sent to an encoder 124, which creates the data structure 100 and interpolation function table 102 shown in FIG. 3. This set-up data and a reduced number of FAPs are conveyed to a decoder 126 via a channel 128. Channel 128 can be any means by which data can be conveyed, such as over a computer network or retrieved from a data storage medium. The decoder recreates the interpolation FAPs from the received FAPs in accordance with the set-up data, and the decoded bit stream 130 is sent to a receiver or image synthesizer 132 that renders an object based on the reconstructed FAP data. The image synthesizer 132 is a display device such as a computer monitor or television screen, with the rendered object serving to enable teleconferencing, as a computer human "agent", in a 3-D image, or for any of a number of other purposes.

An example of the use of a directed graph per the present invention and how it might be conveyed to a decoder is shown in FIG. 5. The directed graph contains 2 nodes and 1 link. Node 1 (150) contains FAPBs 3, 4 and 5, and node 2 (152) contains FAPs 6 and 7. A directed link 154 points from node 1 to node 2, indicating that the FAPs of child node 2 can be interpolated from those of parent node 1.

Assume that the following interpolation functions are defined for the two FAPs in child node 2:

$F_6 = (F_3 + 2F_4 + 3F_4 + 4F_3 F_4^1)/(5F_6 + 6F_3 F_1 F_3)$ $F_2 = F_1$

Each of these interpolation functions is derived from the rational polynomial discussed above; they assume the form shown here when the appropriate sets of values (K, P, $a_1$, $S_1$, $c_1$, $b_i$, $l_2$, and $m_{ij}$) are supplied to the extended rational polynomial.

One way in which the directed graph and the sets of values can be conveyed to a decoder is via the use of defined fields. For example, the existence of two nodes might be indicated as follows:

[2] (field 1)

and the FAPs found within them indicated as:

[3 4 5 −1 6 7 −1] (field 2) indicating that one node holds FAPs 3, 4 and 5 and one node holds nodes 6 and 7. "−1" indicates that the last term in a set has been reached.

The number of links in the graph cold be indicated as follows:

[1] (field 3)

with the relationship between the nodes indicated in a field as follows:

[1 2] (field 4) meaning that a directed link points from node 1 to node 2.

The set of values associated with the interpolation functions might be sent in several fields. The number of terms in the numerator of each expression might be indicated as follows:

[4 1] (field 5)

indicated that there are four terms in the numerator of the expression for $F_5$ and one term in the numerator of the expression for $F_3$. The number of denominator terms in the two expressions is shown similarly:

[2 1] (field 6)

The numerator exponents might be shown as follows:

[100 010 001 120 010] (field 7)

There are three FAPs in the parent node (150) for $F_6$, and "100" defines the exponents of each of the three FAPs in the corresponding numerator term of the $F_6$ expression. Thus, $F_3^1$ is present in the first numerator term, but $F_4$ and $F_5$ are raised to the zero power (=1), and are thus not present. Similarly, "010" indicates that only $F_4$ is present in the second numerator term, "001" indicates that only $F_5$ is present in the third numerator term, and "120" indicates that $F_3^1$ and that $F_4^2$ are present in the fourth term. Finally, "010" indicates that only $F_4$ is present in the numerator of the expression for $F_2$. The denominator exponents follow the same convention, and their field looks as follows;

[001 111 000] (field 8)

The next field might define the numerator impulse function. If there is not impulse function for a polynomial term, its entry in the field is "0"; otherwise, its entry is of the form $(1, S_1, a_i)$. For this example, none of the numerator terms has an impulse function, and thus the field looks as follows:

[0000 0] (field 9)

The coefficients found in the respective numerators are shown as follows:

[1234 1] (field 10)

indicating the coefficients of the first, second, third and fourth terms, respectively, in the numerator of the $F_6$ expression, and the coefficient of the first (and only) term in the numerator of the $F_1$ expression. The denominator coefficients are handled similarly:

[56 1] (field 11)

The fields described above are conveyed to a decoder. When FAPs 3, 4 and 5 are subsequently received by the decoder, it knows to interpolate FAPs 6 and 7 from them based on the directed graph (fields 1 and 2), which it does by substituting the appropriate received values (fields 5–11) into the extended rational polynomial and calculating the resulting expressions.

Note that this example illustrates only one possible way to represent and convey a given data structure and corresponding polynomial values to a decoder. Many alternative methods are likely to work equally well. It should also be noted that while only GAP to GAP interpolation has been discussed herein, the described method is also useful for FAP to mesh interpolation.

While particular embodiments of the invention have been shown and described, numerous variations and alternate embodiments will occur to those skilled in the art. Accordingly, it is intended that the invention be limited only in terms of the appended claims.

We claim:

1. A computer-readable medium having stored thereon a data structure comprising:
   a parent node having at least one defining parameter that represents an object;
   a child node having at least one parameter that represents an interrupted object; and
   a link that logically identifies the parent node to the child node with the link associated with a polynomial function that results in the interpreted object from the at least one parameter.

2. The computer-readable medium having stored thereon a data structure of claim 1 including, a second link from the child node to another child node, the second link associated with another polynomial function that results in another interpreted object when the at least one parameter is applied to the polynomial function and the other polynomial function.

3. The computer-readable medium having stored thereon a data structure of claim 1 including, a second link that logically identifies the child node to the parent node with the second link associated with another polynomial function that results in another interpreted object.

4. The computer-readable medium having stored thereon a data structure of claim 1, wherein the link is a direct link.

5. The computer-readable medium having stored thereon a data structure of claim 1, wherein the at least one defining parameter further comprises, a set of parameters $G_1, G_2, \ldots G_n$,
   the polynomial function is a set of polynomial functions $F1 \ldots Fn$, and
   an extended rational polynomial is an interpolation function that defines interpolation of the set of parameters $I(G_1, G_2, \ldots, G_n)$, as equal to $$I(F_1, F_2, \ldots F_n) = \sum_{i=0}^{K-1} \delta(F_{S_i} - a_i) / \sum_{i=0}^{P-1} \left( b_i \prod_{j=1}^{n} F_j^{m_{ij}} \right)$$

where the K and P are numbers of polynomial products in a numerator polynomial and a denominator polynomial of the interpolation function, respectively, $c_i$ and $b_i$ are the coefficients of the ith products, $l_{ij}$ and $m_{ij}$ are the powers of $F_j$ in the ith product, and $\delta(F_{S_i} - \alpha_i)$ is an optional impulse function defined for each term in the numerator polynomial.

6. The computer-readable medium having stored thereon a data structure of claim 1, wherein the at least one parameter is a graphic articulation parameter (GAP) that defines animation of the object.

7. The computer-readable medium having stored thereon a data structure of claim 6, wherein the GAP is a facial animation parameter (FAP) that defines the animation of a ace.

8. An apparatus comprising:
   a receiver coupled to a channel that receives an encoded data frame having at least one parameter associated with a data structure;
   a decoder coupled to the receiver, wherein the decoder having access to the data structure decodes the encoded data frame in response to receipt of the encoded data frame resulting in a decoded bit stream; and
   an image synthesizer coupled to the decoder and after receipt of the decoded bit stream, processes the decoded bit stream into an object.

9. The apparatus of claim 8, wherein the data structure is configurable by the decoder upon receipt of an encoded data frame from the receiver.

10. The apparatus of claim 8, wherein the data structure contains a parent node linked to a child node by a first link associated with a polynomial function that results in an interpreted object when the at least one parameter is applied to the polynomial function.

11. The apparatus of claim 10, wherein the data structure further including a second link from the child node to another child node, the second link associated with another polynomial function that results in another interpreted object when the at least one parameter is applied to the other polynomial function.

12. The apparatus of claim 8, wherein the at least one parameter is at least on graphic articulation parameter (GAP) that defines animation of the object.

13. The apparatus of claim 12, wherein the at least one GAP is at least one facial animation parameter (FAP) that defines the animation of a face.

* * * * *